United States Patent
Yano et al.

(10) Patent No.: US 7,760,632 B2
(45) Date of Patent: Jul. 20, 2010

(54) DEVICE AND METHOD FOR RELAYING PACKETS

(75) Inventors: Hiroki Yano, Toyota (JP); Kazuo Sugai, Hadano (JP); Shinichi Akahane, Hachioji (JP); Yoshinori Hachiya, Yokohama (JP)

(73) Assignee: Alaxala Networks Corporation, Kawasaki (JP)

( * ) Notice: Subject to any disclaimer, the term of this patent is extended or adjusted under 35 U.S.C. 154(b) by 284 days.

(21) Appl. No.: 11/830,912

(22) Filed: Jul. 31, 2007

(65) Prior Publication Data

US 2008/0049778 A1 Feb. 28, 2008

(30) Foreign Application Priority Data

Aug. 25, 2006 (JP) ............................. 2006-228898

(51) Int. Cl.
*G01R 31/08* (2006.01)
*H04L 12/28* (2006.01)
(52) U.S. Cl. ............................. 370/230.1; 370/395.32
(58) Field of Classification Search ........................ None
See application file for complete search history.

(56) References Cited

U.S. PATENT DOCUMENTS

| 7,102,996 B1* | 9/2006 | Amdahl et al. | 370/230 |
| 7,447,166 B1* | 11/2008 | Kaluve et al. | 370/254 |
| 2003/0147385 A1* | 8/2003 | Montalvo et al. | 370/389 |
| 2004/0184453 A1* | 9/2004 | Moriwaki | 370/389 |
| 2005/0047334 A1* | 3/2005 | Paul et al. | 370/229 |
| 2005/0276263 A1* | 12/2005 | Suetsugu et al. | 370/389 |
| 2006/0248227 A1* | 11/2006 | Hato et al. | 709/245 |

FOREIGN PATENT DOCUMENTS

JP  2005-252758  9/2005
JP  2006-005437  1/2006

OTHER PUBLICATIONS

Wikipedia; Link aggregation or IEEE 802.3ad; May 28, 2007; pp. 1-3.

* cited by examiner

*Primary Examiner*—Hong Cho
*Assistant Examiner*—Eunsook Choi
(74) *Attorney, Agent, or Firm*—Antonelli, Terry, Stout & Kraus, LLP.

(57) ABSTRACT

Packets are relayed using a network relay device including a plurality of interface units. Each of the interface units includes one or more physical ports for connection to a line, and a bandwidth controller configured to control transmission bandwidth for packets received by the physical ports. Furthermore, a single specific physical port is selected as the output physical port from the distributed-control logical port based on output port group information unique to the output port group including the distributed-control logical port.

9 Claims, 11 Drawing Sheets

CONTROL INFORMATION 520

HEADER INFORMATION 521

Fig.6

LINK AGGREGATION TABLE 400

| LA NUMBER (TABLE NUMBER) | TOTAL NUMBER OF PHYSICAL PORTS | OUTPUT PORT (SELECTION NUMBER) | | | |
|---|---|---|---|---|---|
| | | #0 | #1 | #2 | ... |
| 0 | 2 | Port#1 (NIF#1) | Port#2 (NIF#2) | ----- | |
| ----- | ----- | ----- | ----- | ----- | |
| | | ⋮ | | | |

Fig.7

FILTER TABLE 410

| VLAN-ID | LINE PORT NUMBER | ADDRESS |
|---|---|---|
| 10 | Port#3(NIF#3) | MACaRT30 |
| 11 | Port#4(NIF#4) | MACaRT40 |
| 100 | LA#0 | MACaRT20 |
| ⋮ | ⋮ | ⋮ |

Fig.8

ROUTING TABLE 430

| DESTINATION IP ADDRESS | LOGICAL INTERFACE (VLAN-ID) | NEXT HOP IP ADDRESS | METRIC |
|---|---|---|---|
| IPrange1 | 100 | IPaRT20 | 50 |
| IPrange2 | 10 | IPaRT30 | 100 |
| IPrange3 | 11 | IPaRT40 | 120 |
| ⋮ | ⋮ | ⋮ | ⋮ |

Fig.9

ARP TABLE 440

| IP ADDRESS | MAC ADDRESS | |
|---|---|---|
| IPaRT20 | MACaRT20 | ← AE1 |
| IPaRT30 | MACaRT30 | ← AE2 |
| IPaRT40 | MACaRT40 | ← AE3 |
| ⋮ | ⋮ | |

Fig.10

FLOW TABLE 450

| OUTPUT VLAN | UPPER LIMIT (Mbps) |
|---|---|
| 100 | 100 |
| ⋮ | ⋮ |

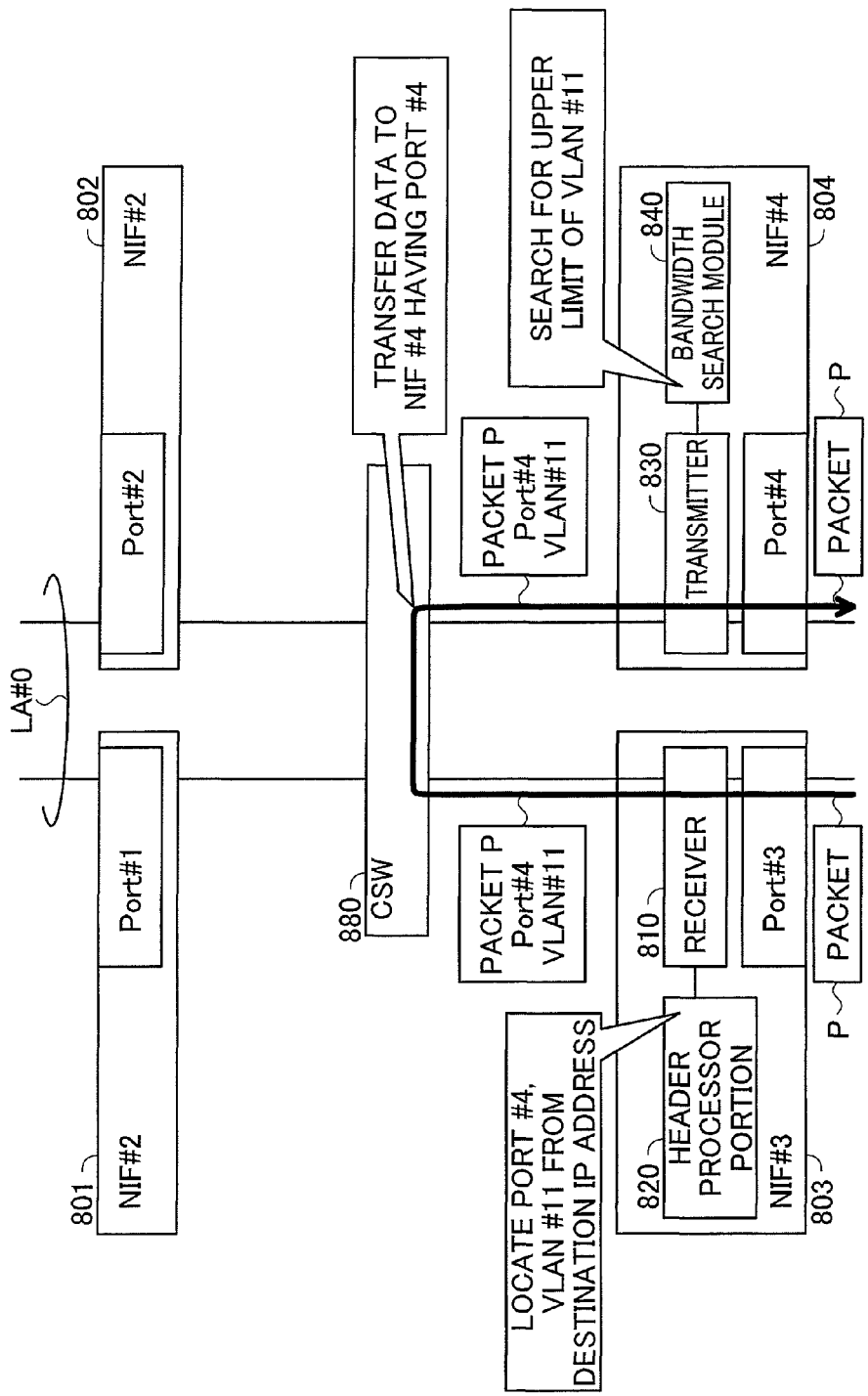

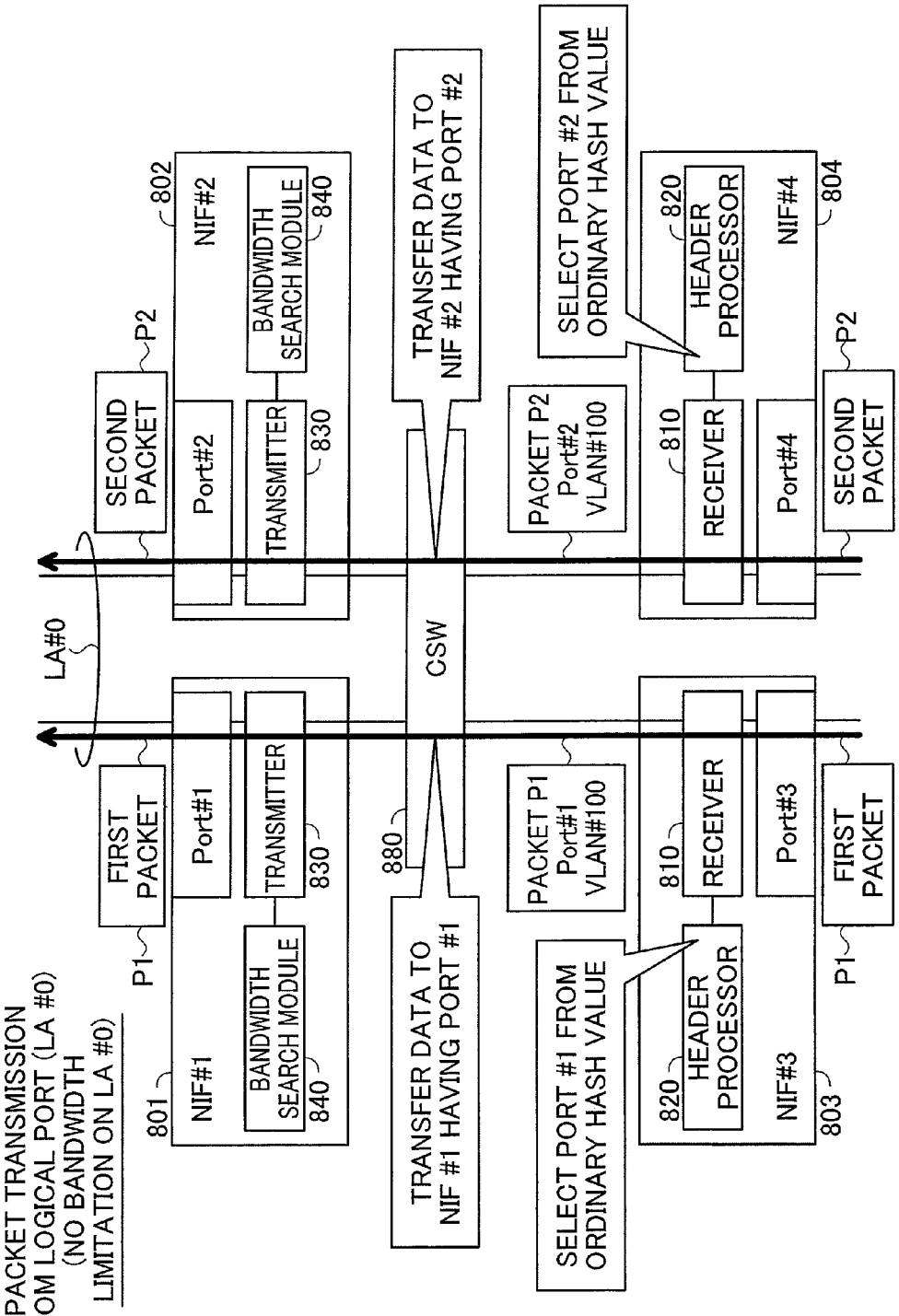

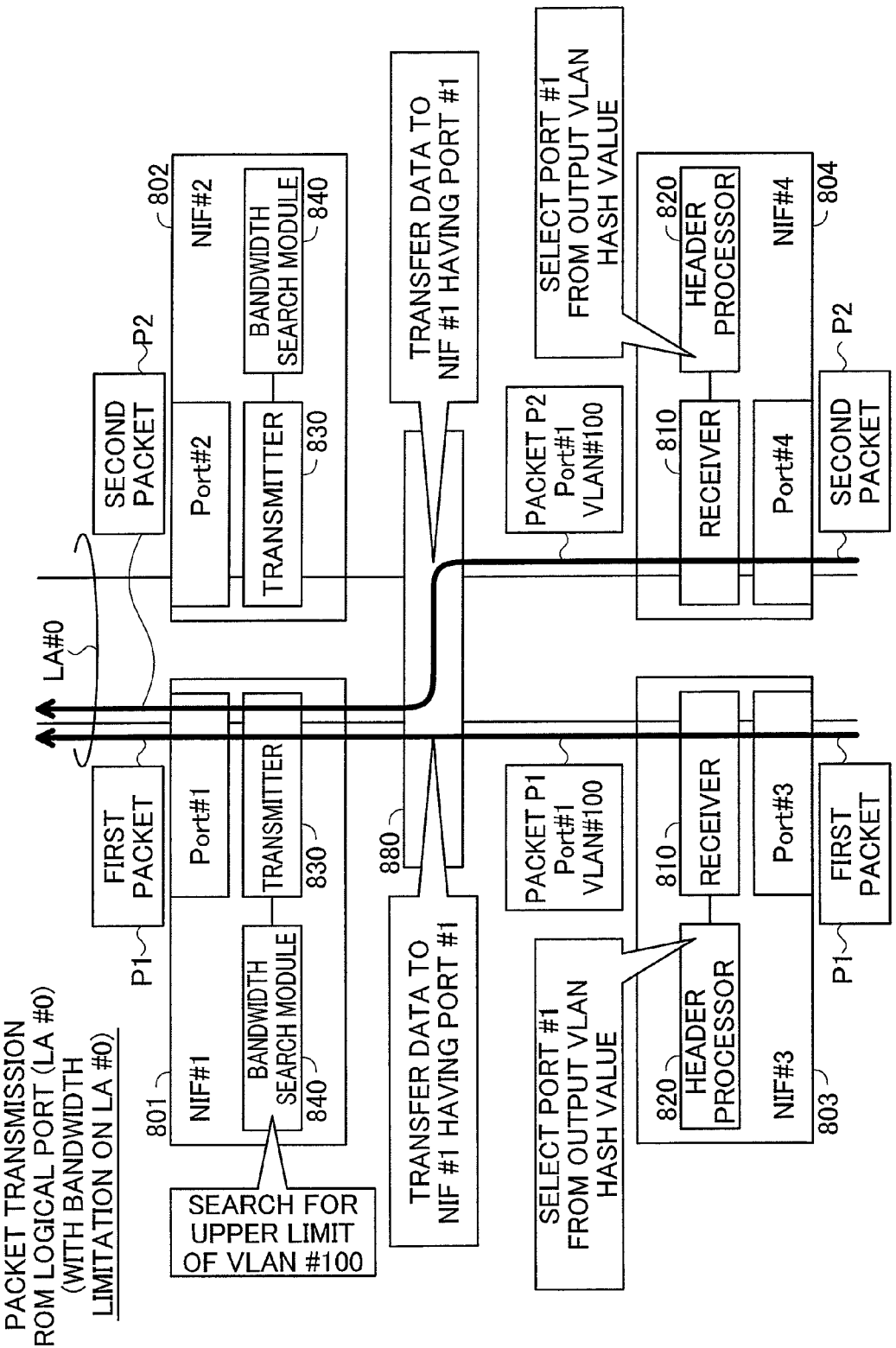

DEVICE AND METHOD FOR RELAYING PACKETS

CROSS-REFERENCE TO RELATED APPLICATIONS

The present application claims the priority based on Japanese Patent Application No. 2006-228898 filed on Aug. 25, 2006, the disclosure of which is hereby incorporated by reference in its entirety.

BACKGROUND

1. Technical Field

The present invention relates to a device and a method for relaying packets.

2. Description of the Related Art

Link aggregation based on the IEEE 802.3ad standard is a known redundant configuration for networks. By link aggregation, it is possible to aggregate a number of physical ports and treat them as a single virtual logical port. A method for distributing the communication load, by using a function to convert information (e.g. the header of a frame being transmitted) into an output value, and based on the output value, selecting a transmission cue corresponding to one of several links is also known (see Japanese Patent Published Application No. 2005-252758A).

The use of bandwidth control to control data transfer speed in a network relay device is also known. Bandwidth control can be implemented through various known methods for controlling data transfer speed, for example, control by limiting the data transfer speed ceiling, or control to ensure a lower limit for data transfer speed. In such instances, a known technique for attaining a faster packet relay process involves providing the network relay device with a multiplicity of bandwidth controllers, with each bandwidth controller performing bandwidth control in relation to a different physical port. Another known related technology is disclosed in Japanese Patent Published Application 2006-5437A.

Where a logical port is configured spanning multiple bandwidth controllers by link aggregation, bandwidth control in relation to the logical port will be carried out in an uncoordinated manner by the multiple bandwidth controllers. A result is that in some instances, the bandwidth of the logical port as a whole cannot be appropriately controlled.

SUMMARY

An object of the invention is to provide a technology for bandwidth control of a logical port configured by link aggregation.

In an aspect of the invention, there is provided a network relay device for relaying packets. The network relay device includes a plurality of interface units, a destination processor, and a bandwidth control setting module. Each of the interface units includes one or more physical ports for connection to a line, and a bandwidth controller configured to control transmission bandwidth for packets received by the physical ports. The physical ports of the plurality of interface units are classified into a plurality of output port groups each including one or more physical ports. Each output port group is associated with output port group information. The destination processor is configured to, based on destination information associated with a received packet, select from among the physical ports a single output physical port for transmission of the received packet. The bandwidth control setting module is configured to set a control value of bandwidth control used by the bandwidth controller. The control value is set individually for at least one of the plurality of output port groups. Furthermore, the network relay device is configured to form one or more distributed-control logical ports each including plural physical ports which are distributed across two or more of the interface units. Plural physical ports of a single distributed-control logical port are aggregated as a single virtual logical port by a link aggregation function of the network relay device, and plural physical ports of a single distributed-control logical port are included in a single output port group for which the control value has been set. The destination processor executes: (i) a first process of selecting the distributed-control logical port for transmission of the received packet based on the destination information, (ii) a second process of selecting a single specific physical port as the output physical port from among the physical ports included in the distributed-control logical port based on the output port group information unique to the output port group including the distributed-control logical port.

According to this network relay device, based on output port group information unique to the output port group including the distributed-control logical port, a single specific physical port is selected as the output physical port from among the plurality of physical ports included in the distributed-control logical port, whereby the entire bandwidth of the distributed-control logical port is controlled by control of the bandwidth of that output physical port, by bandwidth controller of the interface unit including the specific output physical port. As a result, the bandwidth of the logical port can be controlled.

Preferred Features

In the network relay device described above, it is preferable that the output port group forms a virtual LAN architecture that divides a network including the plurality of physical ports into virtual partial networks.

According to this arrangement, the control value for bandwidth control is set for each individual virtual LAN, whereby bandwidth control can be carried out on an individual VLAN basis.

In the network relay device described above, it is preferable that the virtual LAN architecture includes a plurality of virtual LANs each representing one of the plurality of output port groups, the plurality of virtual LANs includes one or more bandwidth-controlled virtual LANs for which the control value has been set, and the destination processor executes the first process and the second process when relaying the received packet to one of the bandwidth-controlled virtual LANs from a physical port that is not included in the same virtual LAN.

According to this arrangement, the first process and second process is executed when a received packet is relayed to one of the bandwidth-controlled virtual LANs from a physical port not included in the same virtual LAN, whereby it is possible to control the bandwidth of the logical port, concomitant with a high degree of freedom in design of a network using the network relay device.

In the network relay device described above, it is preferable that the destination processor includes a computing module, and a destination determining module. The computing module is configured to execute a computational process in accordance with a prescribed computational expression. The destination determining module is configured to, based on the computation result, select the output physical port from among the physical ports included in a logical port. The computing module includes a first mode for executing the computational process using the output group information, for the purpose of selecting the output physical port from the distributed-control logical port; and a second mode for executing the computational process using at least one of the destination information and source information associated with the received packet, for the purpose of selecting the output physical port from a logical port for which the control value has not been set.

According to this arrangement, it is possible to achieve both bandwidth control in the distributed-control logical port, and distribution of the communication load in a logical port for which the control value for bandwidth control is not set.

In the network relay device described above, it is preferable that the computational expression used in the computational process is a hash function.

According to this arrangement, it is a simple matter to prevent bias in selection towards a specific physical port, as the physical port selected from within the logical port for which the control value for bandwidth control is not set.

The present invention may be reduced to practice in various other ways, for example, a network relay method and device; a computer program for realizing the functions of such a method or device; a recording medium having such a computer program recorded thereon; a data signal containing such a computer program and embodied in a carrier wave; and so on.

These and other objects, features, aspects, and advantages of the present invention will become more apparent from the following detailed description of the preferred embodiments with the accompanying drawings.

BRIEF DESCRIPTION OF THE DRAWINGS

FIG. 6 an illustration depicting an exemplary link aggregation table 400 (LA table 400);

FIG. 7 is an illustration depicting an exemplary filter table 410;

FIG. 8 is an illustration depicting an exemplary routing table 430;

FIG. 9 is an illustration depicting an exemplary ARP table 440;

FIG. 10 is an illustration depicting an exemplary flow table 450;

FIG. 13 is a simplified diagram illustrating operation in the event of packet transmission from an independent physical port;

FIG. 14 is a simplified diagram illustrating operation in the event of packet transmission from a logical port with unlimited bandwidth; and FIG. 15 is a simplified diagram illustrating operation in the event of packet transmission from a logical port with limited bandwidth.

DESCRIPTION OF THE PREFERRED EMBODIMENT

The embodiments of the present invention will be described herein in the order indicated below.
A. System Configuration of the Embodiment:
B. Packet Relay Process:
C: Variants:

A. System Configuration of the Embodiment

Figure 1:
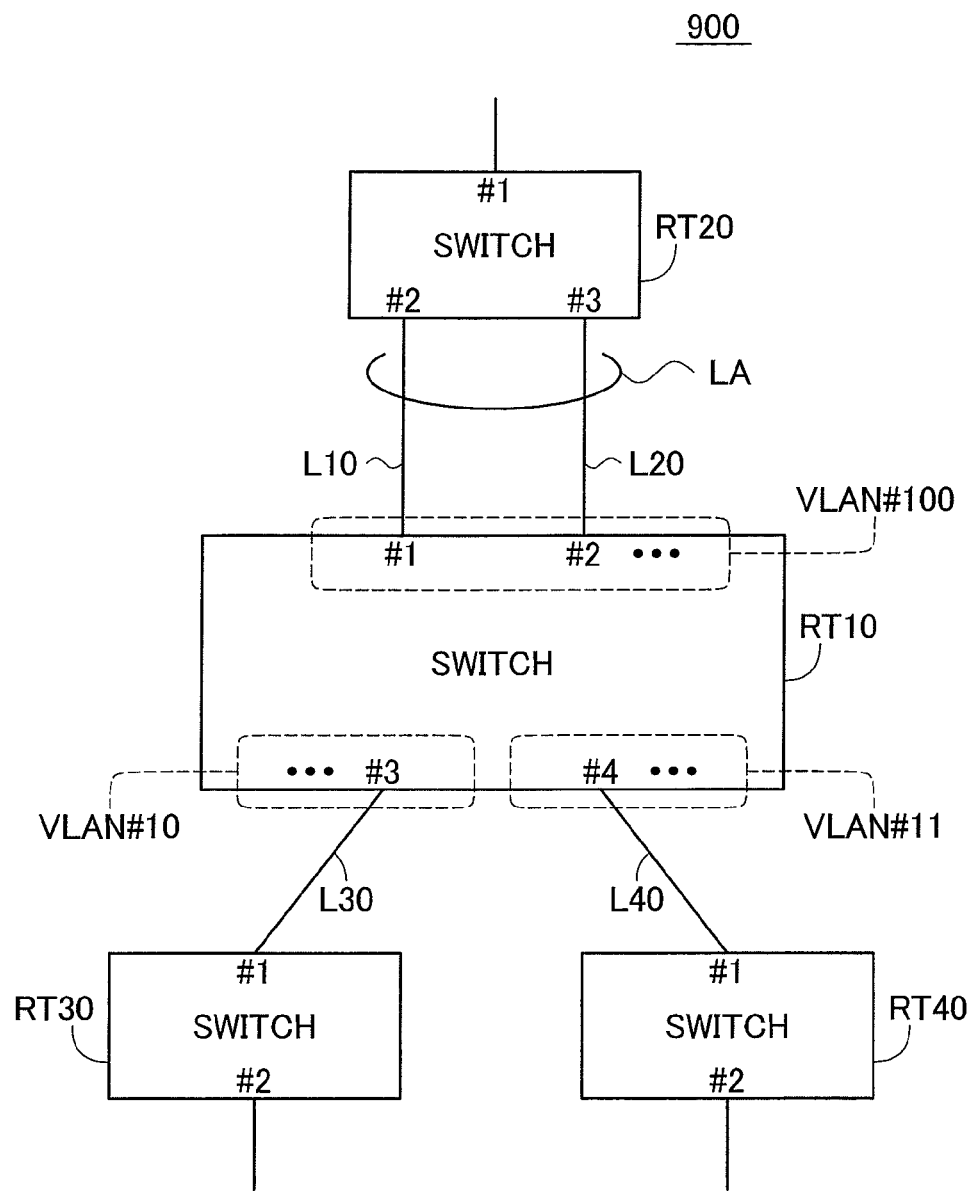
FIG. 1 is an illustration of a network system employing switch devices in an embodiment of the present invention.

FIG. 1 is an illustration of a network system employing switch devices in an embodiment of the present invention. This network system 900 has four switch devices RT10 to RT40. In Embodiment 1, these switch devices RT10 to RT40 all function as "Layer 3 switches" (also called "routers").

Three of the switch devices RT20, RT30, and RT40 are connected to the first switch device RT10. The first switch device RT10 and the second switch device RT20 are connected by two lines L10, L20. The first switch device RT10 and the third switch device RT30 are connected by a single line L30, and the first switch device RT10 and the fourth switch device RT40 are connected by a single line L40.

The switch devices RT10 to RT40 have physical ports for the purpose of connecting to the lines. In FIG. 1, physical port numbers identifying the physical ports are denoted by a combination of the symbol "#" with a number. For example, the line L10 connects to the first physical port (#1) of the first switch device RT10 and to the second physical port (#2) of the second switch device RT20. The physical port numbers are unique numbers assigned without duplication to physical ports within a single switch device. That is, within a single switch device, each physical port is uniquely identified by a physical port number.

The first switch device RT10 and the second switch device R20 are connected by the two lines L10 and L20. By link aggregation, these two lines L10 and L20 are utilized as a single virtual line. The link aggregation function is a function whereby several physical ports are aggregated as utilized as a single virtual port (also termed a "logical port"). This link aggregation function is used for the purpose of achieving wider bandwidth and of ensuring redundancy. In the example of FIG. 1, the two physical ports #1, #2 of the first switch device RT10 are utilized as a single logical port by the link aggregation function. The two physical ports #2, #3 of the second switch device RT20 to which these ports #1, #2 of the first switch device RT10 are connected are also utilized as a single logical port by the link aggregation function.

Hereinafter, logical ports set up by link aggregation, and physical ports not included in any logical ports (herein also termed "independent physical ports") will be referred to respectively as "line ports." That is, in the switch devices, the line port is utilized as a port for connection of single independent line (including single virtual line).

VLANs (Virtual Local Area Networks) are set up in the first switch device RT10. In FIG. 1, VLAN numbers identifying the VLANs are shown by a combination of the symbol "VLAN#" and a number. The first physical port #1 and the second physical port #2 are included in a $100^{th}$ VLAN (VLAN #100). The third physical port #3 is included in a $10^{th}$ VLAN (VLAN #10), and the fourth physical port #4 is included in an $11^{th}$ VLAN (VLAN #11).

A VLAN represents a group including one or more line ports capable of communication with one another at the Layer 2 level. In the embodiment, the first switch device RT10 also functions as a Layer 2 switch. Here, Layer 2 corresponds to the second layer (Data Link layer) of the OSI (Open System Interconnection) reference model. Packet relay at the Layer 2 level utilizes the destination Layer 2 address contained in a received packet (in the embodiment, the destination MAC address) as the final destination. Here, when the first switch device RT10 in its role as a Layer 2 switch relays packets, it will relay the packets exclusively to line ports belonging to the same VLAN, and will not relay packets to other VLANs. By dividing multiple line ports into multiple VLANs in this way, it is possible to prevent the communication load from extending to unintended line ports (other VLANs). Specifically, a network including a multiplicity of physical ports can be divided in to virtual partial networks (also called "network segments"). When the first switch device R10 relays packets in its function as a Layer 3 switch (router), it will relay packets to other VLANs. Packet relay at the Layer 3 (Network layer) level utilizes the destination Layer 3 address contained in a received packet (in the embodiment, the destination IP address) as the final destination.

The first switch device RT10 may have a number of physical ports (not shown) besides the illustrated physical ports (#1 to #4). This is true of the other switch devices R20 to RT40 as well. The VLAN #100, VLAN #10, and VLAN #11 may also include other physical ports in addition to the physical ports depicted in FIG. 1.

Figure 2:
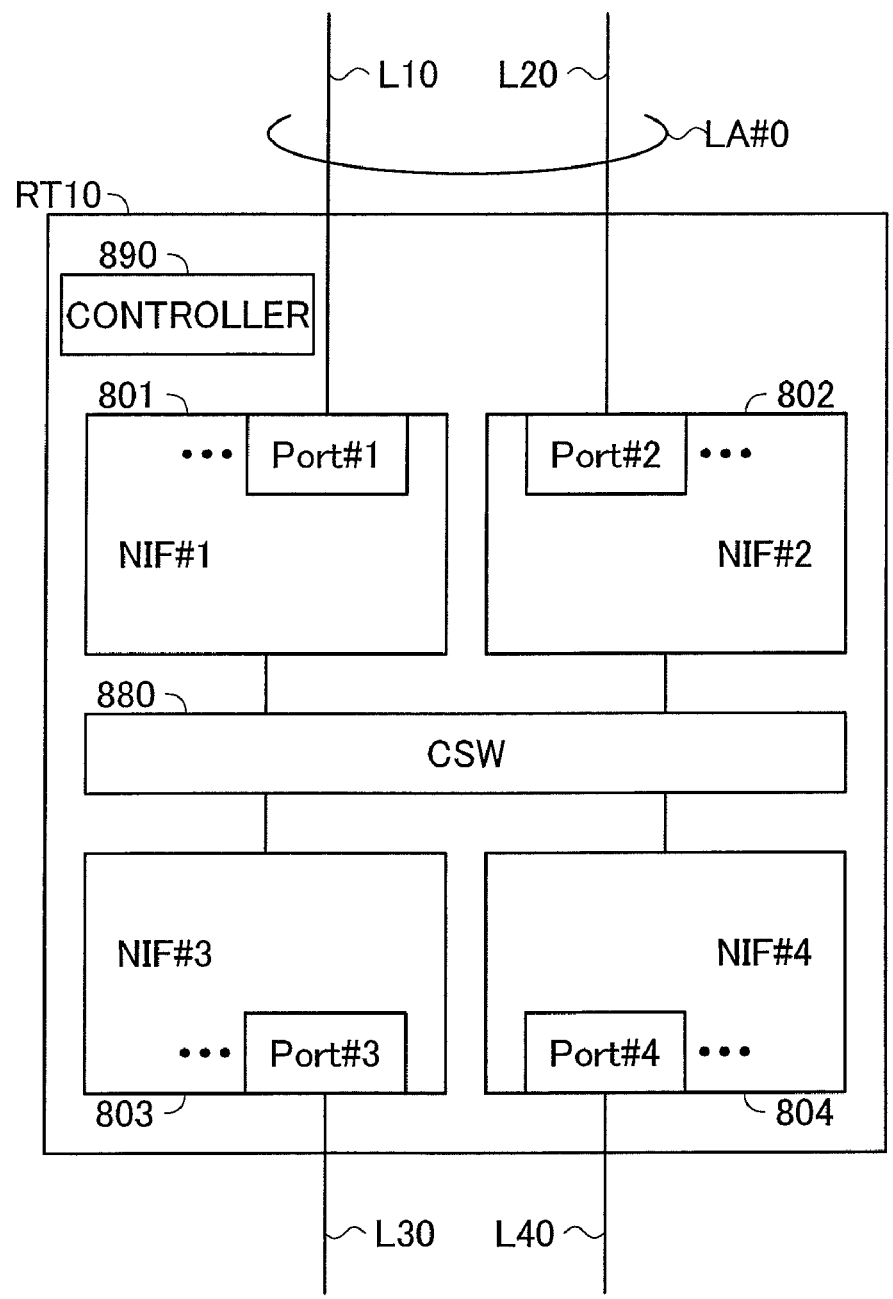
FIG. 2 is an illustration depicting the configuration of a first switch device R10.

FIG. 2 is an illustration depicting the configuration of the first switch device R10. This switch device RT10 has a controller 890, four network interface units 801 to 804 (herein also referred to as "NIFs 801 to 804"), and a crossbar switch 880 (herein also referred to as "CSW 880"). The NIFs 801 to 804 are connected to the CSW 880.

The NIFs 801 to 804 are electronic circuits having physical ports for connection to lines. Each of the NIFs 801 to 804 performs control of packet communication via its physical port. In the example of FIG. 2, the first NIF 801 has the first physical port #1, the second NIF 802 has the second physical port #2, the third NIF 803 has the third physical port #3, and the fourth NIF 804 has the fourth physical port #4. It is possible for the NIFs 801 to 804 to have two or more physical ports as well (not shown).

In FIG. 2, NIF numbers identifying the NIFs are shown by a combination of the symbol "NIF#" and a number. For example, the NIF number of the first NIF 801 is "1." NIF numbers are unique numbers assigned without duplication to NIFs within a single switch device.

The CSW 880 is an electronic circuit for performing packet transfer among NIFs.

The controller 890 performs overall control of the first switch device RT10. The controller 890 is a computer having a CPU and memory. The various functions of the controller 890 are accomplished by execution of a program by the CPU. The controller 890 is connected via a bus (not shown) to each of the NIFs 801-804 and to the CSW 880.

Figure 3:
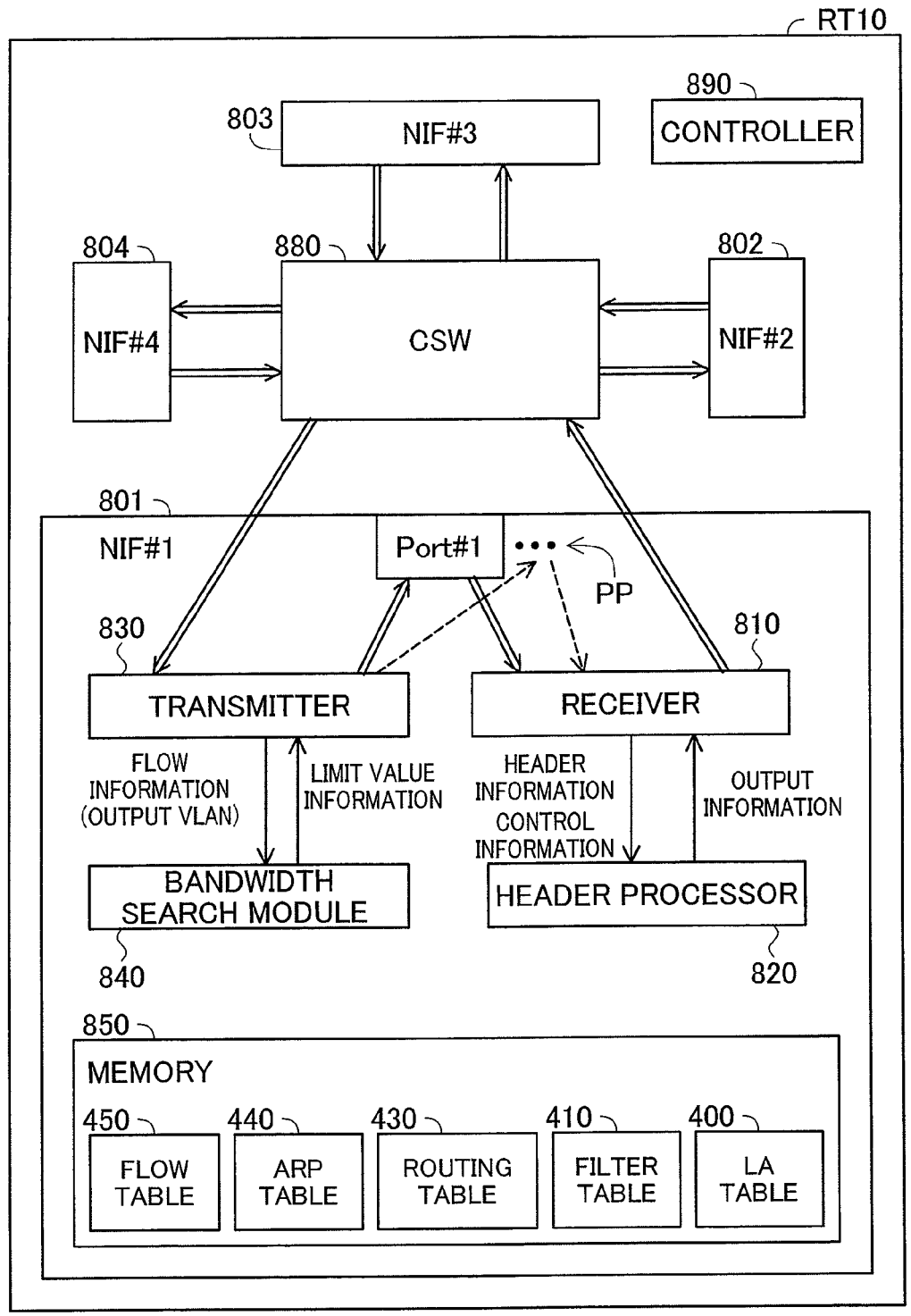
FIG. 3 is an illustration depicting in detail the configuration of the first switch device R10.

FIG. 3 is an illustration depicting in detail the configuration of the first switch device R10. The configuration of the first NIF 801 is depicted in detail in FIG. 3. The first NIF 801 has one or more physical ports PP including the first physical port #1; a receiver 810; a header processor 820; a transmitter 830; a bandwidth search module 840; and a memory 850. The physical ports PP are electronic circuits for carrying out communication via lines. The modules 810, 820, 830, 840 are ASICs (Application Specific Integrated Circuits) designed to achieve various functions, discussed later. The constituent elements 810, 820, 830, 840, 850 are interconnected via a bus (not shown). The receiver 810 and the transmitter 830 are connected respectively to all of the physical ports PP provided to the first NIF 801.

The receiver 810 acquires received packets from the physical ports PP. Based on destination information associated with received packets, the header processor 820 determines a physical port by which the received packets should be sent (an output physical port). The receiver 810 then sends the received packets via the CSW 880, to the NIF having the determined output physical port.

Meanwhile, the transmitter 830 acquires received packets from the CSW 880. The bandwidth search module 840 searches for a bandwidth limit in relation to the output physical port. The transmitter 830 transmits the received packets from the physical port PP (output physical port), in such a way that the transmission speed of data transmitted from the physical port PP does not exceed the detected bandwidth limit. Here, data transmission speed refers to the amount of data transmitted within a prescribed given interval. Any arbitrary time interval (e.g. one second) may be employed as the given interval.

The memory 850 stores a link aggregation table 400 (also referred to herein as "LA table 400"), a filter table 410, a routing table 430, an ARP table 440, and a flow table 450. These tables are utilized for determining the output physical port, or for packet transmission based on bandwidth control (discussed in detail later).

The configurations of the other NIFs 802 to 804 are the same as that of the first NIF 801. The NIFs 801 to 804 control data communication via their respective physical ports PP.

Figure 4:
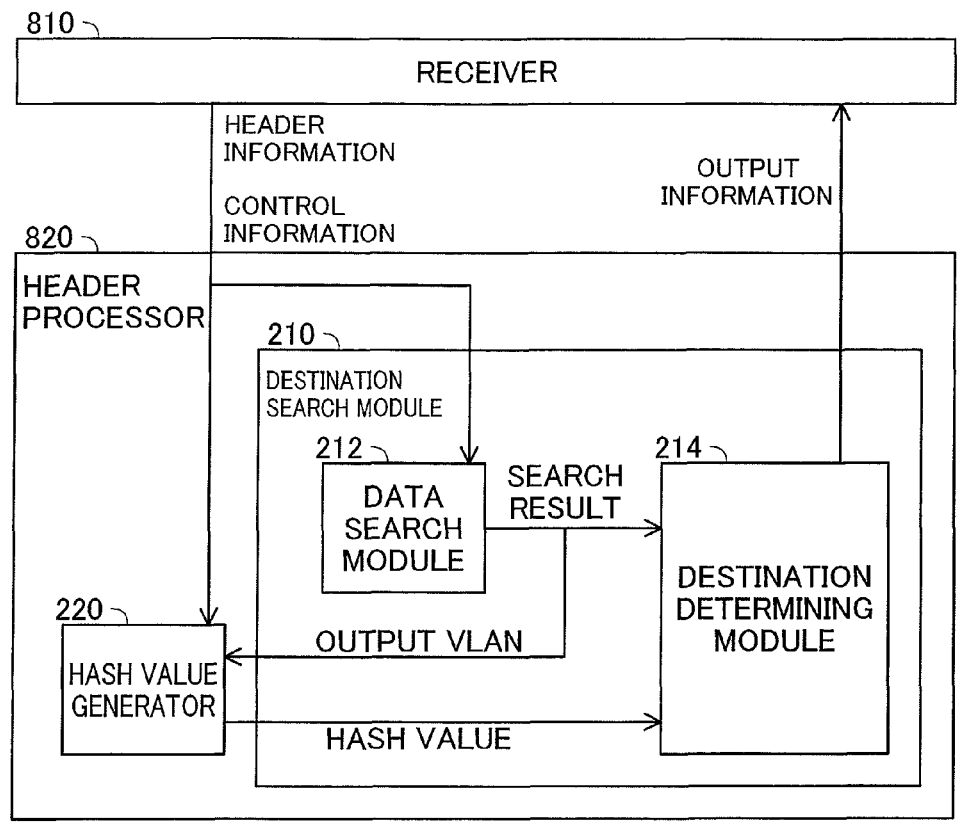
FIG. 4 is an illustration depicting in detail the configuration of a header processor 820.

FIG. 4 is an illustration depicting in detail the configuration of the header processor 820. The header processor 820 includes a destination search module 210 and a hash value generator 220. The destination search module 210 includes a data search module 212 and a destination determining module 214. The receiver 810 provides the header processor 820 with the header data of the received packets and with control information relating to the received packets. Based on the header information and the control information, the data search module 212 selects a line port for transmitting the received packets. Based on the selected line port, the destination determining module 214 determines a physical port for transmitting the packets (an output physical port). In the event that the selected line port is a logical port (link aggregation), based on a hash value, the destination determining module 214 will select one output physical port from among the multiplicity of physical ports included in the logical port. This hash value is provided by the hash value generator 220. This process will be discussed in detail later.

Figure 5A:
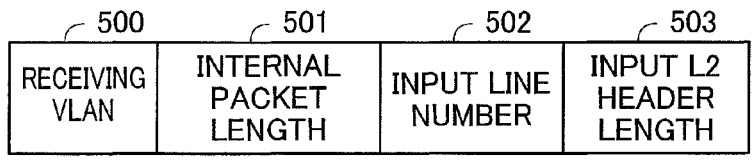
FIGS. 5(A) and 5(B) show control information 520 and header information 521.
Figure 5B:
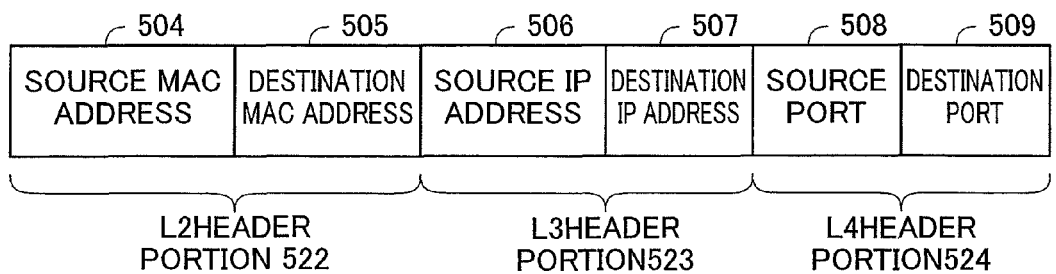

FIG. 5 (A) is an illustration showing control information 520. The control information 520 is provided for each packet acquired by the receiver 810. That is, the control information 520 is information associated with a packet. The control information 520 includes receiving VLAN 500, internal packet length 501, input line number 502, and input L2 header length 503. The receiving VWAN 500 indicates the number of the VWAN (virtual LAN) to which the line port which received the packet belongs. As will be discussed later, associations between line ports and VLANs are stored in the filter table 410 (FIG. 3). The internal packet length 501 indicates the size of the packet. The input line number 502 indicates the number of the physical port that received the packet. The input L2 header length 503 indicates the size of the L2 header portion 522, to be discussed later. This data is appropriately used for checking packet integrity and so on (not discussed in detail herein).

FIG. 5 (B) is an illustration showing header information 521. The header information 521 is the header of a packet acquired by the receiver 810. The header information 521 includes an L2 (Layer 2) header portion 522, an L3 (Layer 3) header portion 523, and an L4 (Layer 4) header portion 524. The L2 header portion 522 includes a source MAC address 504 and a destination MAC address 505. The L3 header portion 523 includes a source IP address 506 and a destination IP address 507. The L4 header portion 524 includes a source port 508 and a destination port 509. The ports 508, 509 are data indicating so-called Layer 4 ports (also referred to herein as "L4 ports") and are unrelated to the line ports of the switch devices.

FIG. 6 is an illustration depicting an exemplary link aggregation table 400 (LA table 400). The LA table 400 is a table that defines logical ports. The LA table 400 specifies associations between a link aggregation number unique to a logical port (also termed an "LA number" or "table number"), the total number of physical ports included in the logical port, and the physical ports included in the logical port. In the example of FIG. 6, the entirety of two physical ports, namely a first physical port #1 and a second physical port #2, are utilized as a single virtual port (logical port). The logical port is assigned an LA number of "0."

Each of the several physical ports included in a single logical port is assigned a selection number identifying the physical port. The selection number is an integer starting from 0. In the example of FIG. 6, the first physical port #1 is assigned a selection number of "0" and the second physical port #2 is assigned a selection number of "1." This selection number will be utilized in the destination search process, to be discussed later.

The controller 890 (FIG. 2) establishes values for each entry in the link aggregation table 400, in accordance with instructions by the user. User instructions may be input, for example, via a control panel (not shown) provided to the switch device RT10, or an administration terminal (not shown) connected to the switch device RT10. In accordance with instructions by the user, the controller 890 sets up the LA table 400 for all of the NIFs 801 to 804. By so doing, the same link aggregation table 400 is stored in the memory 850 (FIG. 3) of all the NIFs 801 to 804.

In the present embodiment, in the event that a physical port number has been identified, the NIF number of the NIF having the physical port will be uniquely identified as well. The constituent elements of the switch device RT10 (e.g. the NIFs 801 to 804 and the CSW 880) are capable of identifying the NIF number of the NIF having the physical port from the physical port number alone. These physical port numbers are established in advance. For example, the controller 890 (FIG. 2) may assign numbers automatically to the physical ports when the switch device RT10 is started up. In FIG. 6, for convenience in description, NIF numbers are shown in conjunction with the physical port numbers. This convention will be employed for the filter table 410 to be discussed later as well.

The total number of physical ports included in a single logical port is not limited to "2"; any number could be employed. Likewise, the total number of logical ports utilized by a single switch device is not limited to "1"; any number could be employed.

FIG. 7 is an illustration depicting an exemplary filter table 410. The filter table 410 stores associations among a VLAN-ID, a line port, and the Layer 2 address (MAC address) of a network device connected to the line port.

The VLAN-ID is a unique identifying number of a VLAN (Virtual Local Area Network). In the example of FIG. 7, the VLAN-ID of the third physical port (Port #3) is set to 10, the VLAN-ID of the fourth physical port (Port #4) is set to 11, and the VLAN-ID of the 0th logical port (LA #0) is set to 100. In the same way as setup of the link aggregation table 400, the controller 890 (FIG. 2) establishes associations between the line ports and the VLAN-IDs in the filter table 410 for all of the NIFs 801 to 804, in accordance with user instructions.

The associations between line ports and MAC addresses are established automatically in the filter table 410 by the destination search module 210 (FIG. 4). Specifically, the destination search module 210 acquires the source MAC address by looking up the header information of a packet received by the receiver 810. The destination search module 210 then registers in the filter table 410 an association of the source MAC address with the line port that received the packet. In the event that the physical port which received the packet is an independent physical port, the physical port number will be registered. Where the physical port which received the packet is included in a logical port, the LA number of the logical port will be registered. In the example of FIG. 7, associations relating to three MAC addresses have been registered. The first of these is the association between the third physical port #3 and the MAC address MACaRT30 of the third switch device RT30. The second is the association between the fourth physical port #4 and the MAC address MACaRT40 of the fourth switch device RT40. The third is the association between the 0th logical port (LA #0) and the MAC address MACaRT20 of the second switch device RT20.

In the present embodiment, information relating to all of the physical ports is registered in the filter tables 410 of all of the NIFs 801 to 804. In other words, the filter tables 410 of all of the NIFs 801 to 804 conform with one another. Any method may be employed as the method for making all of the NIFs 801 to 804 conform with one another. For example, the controller 890 (FIG. 2) could periodically synthesize the filter tables 410 of the NIFs 801 to 804 and distribute the synthesized filter tables 410 to the NIFs 801 to 804. Alternatively, in response to an update to the filter table 410 in any NIF, the controller 890 could update the filter tables 410 of the other NIFs in similar fashion.

Multiple network devices may be connected to a single line port. In this case, multiple addresses will be registered in relation to the single line port. Expiration information specifying an expiry date for registered data could be registered in the filter table 410 as well. Where data whose expiry date has passed is deleted from the filter table 410, it becomes a simple matter to update the filter table 410 according to changes in network configuration. The efficiency of utilization of the memory 850 may be improved as well. As the expiry date it would be possible to employ a prescribed period of time elapsed since registration. With regard to physical ports included in a logical port as well, the physical port numbers could be registered in place of the LA number.

FIG. 8 is an illustration depicting an exemplary routing table 430. The routing table 430 stores associations among a destination IP address, a logical interface, a next hop IP address, and a metric. The destination IP address represents the IP address of the ultimate destination of a packet. This destination IP address is not limited to a single IP address; it is possible to set a range that includes two or more IP addresses. The IP address range is typically represented by a combination of a so-called network address and a subnet mask.

The logical interface represents the logical interface at which the destination IP address is accessible. In the present embodiment, narrowing down the multiple physical ports to the particular physical port by which the packet should be sent is initially carried out based on groups each including one or more physical ports (discussed in detail later). Such a group constitutes a logical interface. In Embodiment 2, the VLANs mentioned earlier are utilized as such groups (logical interfaces). That is, initially, the VLAN (network segment) utilized to relay the packet will be selected.

Next hop refers to the next switch device. Specifically, when a packet is transmitted to the next hop, the packet can reach the final destination IP address. Each logical interface of the routing table 430 has associated with it a single next hop IP address accessible from that logical interface. For example, in the example of FIG. 8, the IP address IPaRT20 of the second switch device RT20 is associated with the $100^{th}$ VLAN. The IP address IPaRT30 of the third switch device RT30 is associated with the $10^{th}$ VLAN, and the IP address IPaRT40 of the fourth switch device RT40 is associated with the $11^{th}$ VLAN.

The metric represents an order of precedence for selection of the logical interface. In the example of FIG. 8, a smaller metric indicates higher order of precedence. As such a metric it would be possible to employed, for example, the number of hops (total number of routers through which the packet passes) or OSPF cost. The metric is used in instances where multiple logical interfaces are associated with the same destination IP address. In this case, the logical interface with the smallest metric will be selected from among the multiple logical interfaces.

The routing table 430, like the link aggregation table 400 (FIG. 6), is set up in accordance with user instructions. In response to user instructions, the controller 890 (FIG. 2) sets up the routing table 430 for each NIF 801 to 804. Alternatively, the destination search module 210 (FIG. 4) may construct (or modify) the routing tables 430 automatically. In this process the destination search module 210 may construct (or modify) the routing tables 430 based on information transmitted by a routing protocol such as RIP (Routing Information Protocol) or OSPF (Open Shortest Path First). In this case, it is preferable that the routing tables 430 of all of the NIFs 801 to 804 conform with one another. A method similar to the method for bringing the aforementioned filter tables 410 into conformance may be employed as the method for bringing the routing tables 430 all of the NIFs 801 to 804 into conformance.

FIG. 9 is an illustration depicting an exemplary ARP table 440. This ARP table 440 stores associations between IP addresses and MAC addresses. In the example of FIG. 9, associations relating to the second switch device RT20 (first entry AE1), the third switch device RT30 (second entry AE2), and the fourth switch device RT40 (third entry AE3) are stored. The destination search module 210 (FIG. 4) constructs the ARP table 440 automatically. Specifically, the destination search module 210 acquires the source IP address and the source MAC address by referring to the header information of the packets received by the receiver 810. The destination search module 210 then stores these address associations in the ARP table 440. The destination search module 210 could also construct the ARP table 440 automatically based on information transmitted by ARP (Address Resolution Protocol). In this case, it is preferable that ARP tables 440 of all of the NIFs 801 to 804 conform with one another. A method similar to the method for bringing the aforementioned filter tables 410 into conformance may be employed as the method for bringing the ARP tables 440 all of the NIFs 801 to 804 into conformance.

FIG. 10 is an illustration depicting an exemplary flow table 450. This flow table 450 is a table for storing settings for bandwidth control. In the present embodiment, an upper limit value for data transfer speed is established by this table 450. A bandwidth limit is then set for each output VLAN. The output VLAN refers to the VLAN (logical interface) used for packet transmission. In the example of FIG. 10, the upper limit for the $100^{th}$ VLAN is set to 100 Mbps. In the present embodiment, the upper limit pertains to the total transfer speed of all physical ports included in an output VLAN. For example, consider the case where an output VLAN composed of two physical ports has an upper limit of 100 Mbps. In this case, it would not be permissible for the two physical ports to simultaneously transmit packets at 100 Mbps. However, during intervals in which one of the physical ports is not transmitting packets, it would be permissible for the other physical port to transmit packets at 100 Mbps.

In response to user instructions, the controller 890 (FIG. 2) sets up a flow table 450 for each NIF 801 to 804. User instructions may be input, for example, via a control panel (not shown) provided to the switch device RT10, or an administration terminal (not shown) connected to the switch device RT10.

B. Packet Relay Process

Figure 11:
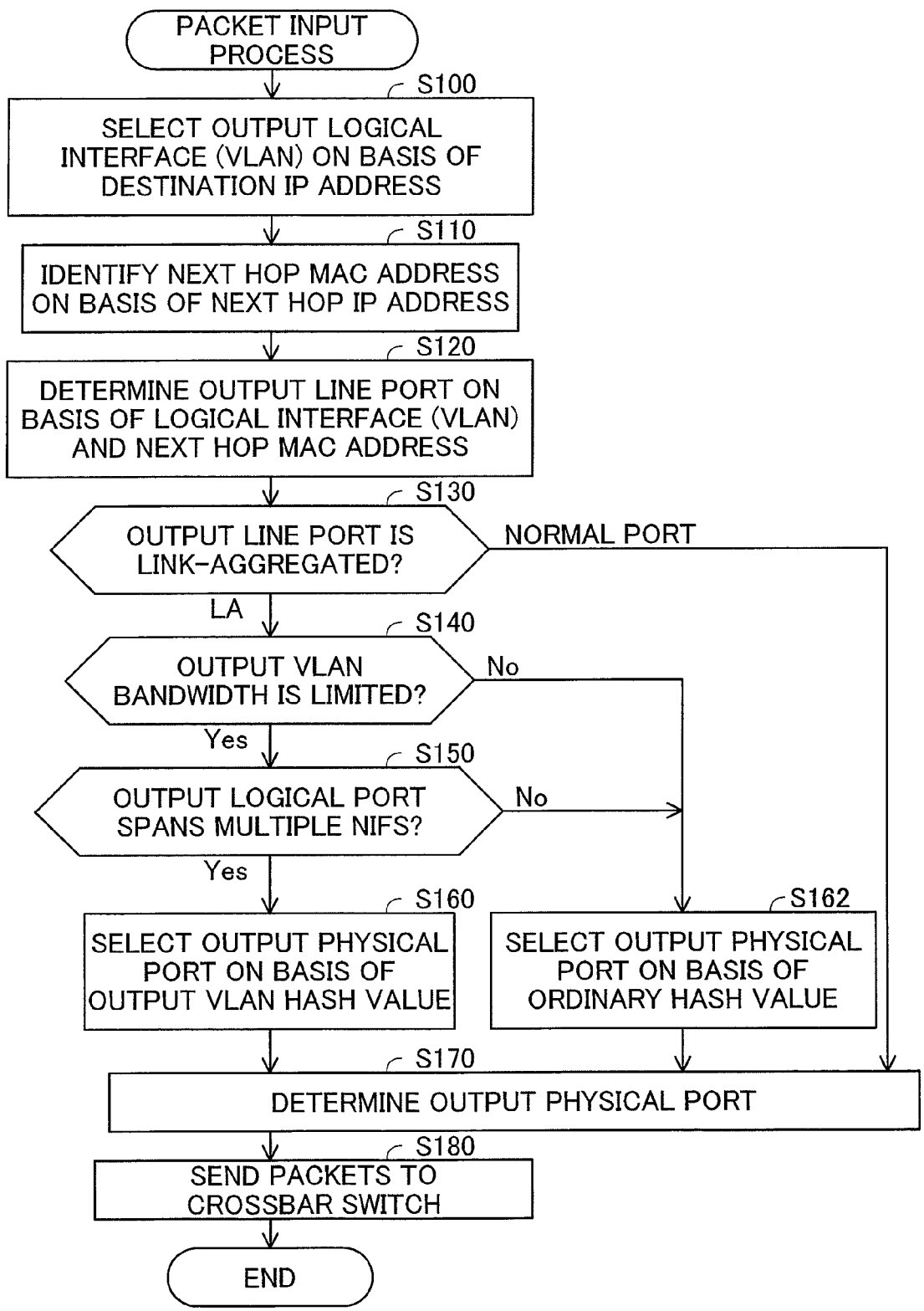
FIG. 11 is a flowchart depicting the procedure of a packet input process.
Figure 12:
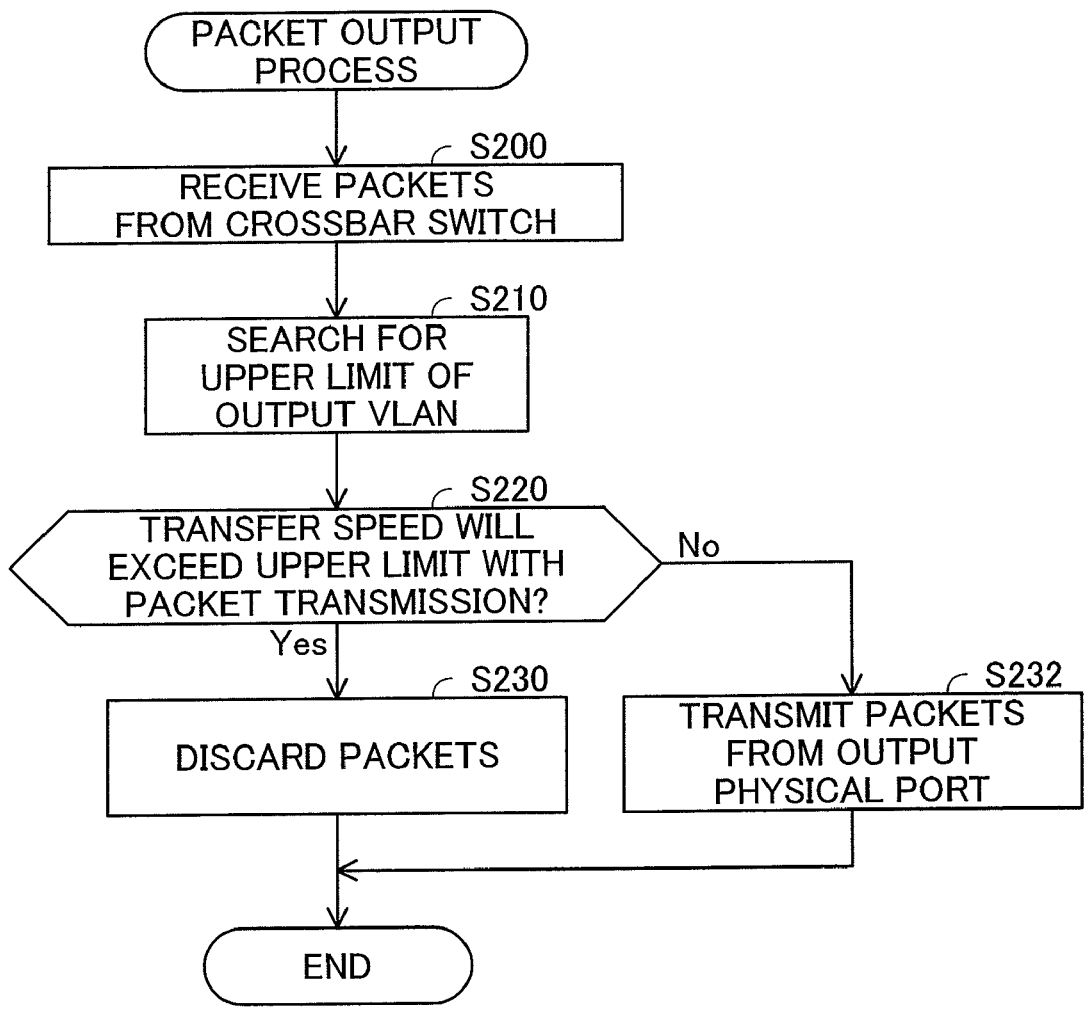
FIG. 12 is a flowchart depicting the procedure of a packet output process.

The Layer 3 level packet relay process in the first switch device RT10 is divided into a packet input process and a packet output process. FIG. 11 is a flowchart depicting the procedure of the packet input process. This packet input process is executed by the NIF which has received a packet. Specifically, the packet input process is executed by the receiver 810 (FIGS. 3, 4), the header processor 820, and the CSW 880. FIG. 12 is a flowchart depicting the procedure of the packet output process. This packet output process is executed by the NIF which is assigned to transmit the packet. Specifically, the packet output process is executed by the transmitter 830, the bandwidth search module 840, and the CSW 880. The packet relay process will be discussed below, in the following order.

B1. Packet Transmission from an Independent Physical Port:
B2. Packet Transmission from a Logical Port without Bandwidth Limitation:
B3. Packet Transmission from a Logical Port with Bandwidth Limitation:

B1. Packet Transmission from an Independent Physical Port

FIG. 13 is a simplified diagram illustrating operation in the event of packet transmission from an independent physical port. In this example, a packet P is received by the third NIF 803, and the packet P is transmitted by the fourth NIF 804. That is, the packet input process is executed by the third NIF 803, while the packet output process is executed by the fourth NIF 804.

The packet input process is initiated in response to receipt of a packet by the switch device RT10. In the initial Step S100, the data search module 212 (FIG. 4) of the header processor 820 looks up in the routing table 430 (FIG. 8) in order to search for the logical interface (VLAN) associated with the destination IP address of the received packet P. In the event that the total number of logical interfaces found is 1, the data search module 212 will employ the found logical interface as the logical interface for output. In the event that the total number is 2 or more, the data search module 212 will employ the logical interface having the smallest metric (highest order of precedence) as the logical interface for output. In the example of FIG. 13, the destination IP address is assumed to lie within the third IP address range IPrange3 (FIG. 8). As a result, the $11^{th}$ VLAN (VLAN #11) will be employed as the logical interface for output.

Here, the logical interface for output means the logical interface that is to be used for transmission of the received packets. The use of a given logical interface for transmission of received packets means that the packets will be transmitted from a physical port included in the logical interface.

In the next Step S110, the data search module 212 looks up in the routing table 430 (FIG. 8) and acquires the IP address of the next hop associated with the logical interface for output. Next, the data search module 212 looks up in the ARP table 440 (FIG. 9) and acquires the MAC address of the next hop from the IP address of the next hop. In the example of FIG. 13, the fourth switch device RT40 associated with the 11$^{th}$ VLAN for output is the next hop (FIGS. 1, 8). The MAC address MACaRT40 of the fourth switch device RT40 is acquired from the ARP table 440 (FIG. 9).

In the next Step S120 of FIG. 11, the data search module 212 decides upon a single line port to be used for packet transmission. Specifically, the data search module 212 finds in the filter table 410 (FIG. 7) the line port to which the MAC address of the next hop belongs. At this time, the output line port is found from among the line ports included in the VLAN (logical interface) that was decided upon in Step S100. In the example of FIG. 13, the fourth physical port #4 (FIG. 7) associated with the MAC address MACaRT40 of the next hop RT40 is employed as the output line port. Once the output line port has been searched in this way, the data search module 212 (FIG. 4) notifies the destination determining module 214 of the result of the search for the output line port.

In the next Step S130, the destination determining module 214 (FIG. 4) decides whether the found line port is a logical port (link aggregation port) or a normal port (independent physical port). In the event that the found line port is a normal port (independent physical port), the destination determining module 214 will employ the physical port as the output physical port (Step S170). In the example of FIG. 13, the found line port (the fourth physical port #4) is a normal port, and therefore the fourth physical port #4 is employed as the output physical port.

Once the output physical port has been determined by the destination search process of Steps S100 to S170, in the next Step S180, the destination determining module 214 (FIG. 4) provides the receiver 810 with output information (the result of determination of the output physical port and the output VLAN (logical interface)). The receiver 810 transmits the received packet, together with this output information, to the CSW 880.

The packet output process (FIG. 12) is initiated in response to receipt of a packet by the CSW 880. In the initial Step S200, the CSW 880 provides the received packet and the output information to the NIF to which the output physical port belongs. In the example of FIG. 13, the fourth NIF 804 (transmitter 830) to which the fourth physical port #4 belongs receives the received packet and the output information from the CSW 880.

In the next Step S210, the transmitter 830 (FIG. 13) provides the output information to the bandwidth search module 840. The bandwidth search module 840 then finds the upper limit of the output VLAN by lookup in the flow table 450 (FIG. 10). In the example of FIG. 13, it is assumed that no bandwidth limit has been established for the 11$^{th}$ VLAN.

In the next Step S220, the bandwidth search module 840 provides the transmitter 830 with information representing the found upper limit. Then the transmitter 830 decides whether the total transfer speed will exceed the upper limit if the transmitter 830 transmits the received packet. The total transfer speed is the total speed of all physical ports included in the output VLAN among the physical ports connected to this transmitter 830. For example, the total transmission speed will be determined to exceed the upper limit in the event that the total transfer speed calculated from the amount of data transmitted within a prescribed time interval up to the current point in time exceeds the upper limit if the received packet is transmitted.

In the event that an upper limit has not been set for the output VLAN, it will be decided that the transfer speed will not exceed the upper limit, regardless of packet transmission history.

In the event of a decision that data transfer speed will not exceed the upper limit, the transmitter 830 transmits the received packet from the output physical port to the next hop (Step S232). In the example of FIG. 13, since no upper limit has been established for the 11$^{th}$ VLAN, it is decided that the transfer speed will not exceed the upper limit. The transmitter 830 then transmits the received packet from the output physical port #4.

When on the other hand it is decided that data transfer speed will exceed the upper limit, the transmitter 830 discards the packet without transmitting it (Step S230). As a result, data transfer speed will be kept from exceeding the upper limit.

B2. Packet Transmission from a Logical Port without Bandwidth Limitation

FIG. 14 is a simplified diagram illustrating operation in the event of packet transmission from a logical port without bandwidth limitation. In this example, an instance of relaying two packets P1, P2 is shown. The first packet P1 is received by the third NIF 803 and is transmitted by the first NIF 801. Meanwhile, the second packet P2 is received by the fourth NIF 804 and is transmitted by the second NIF 802. In the example of FIG. 14, it is assumed that the respective destination IP addresses of the two packets P1, P2 are within the first IP address range IPrange1 (FIG. 8).

First, the relay process for the first packet P1 will be described. Steps S100 to S120 of the packet input process (FIG. 11) are executed in the same manner as the example of FIG. 13. In Step S100, the 100$^{th}$ VLAN associated with the first IP address range IPrange1 is selected as the logical interface for output (output VLAN) (FIG. 8). Next, in Step S120, the 0th logical port (LA#0) is selected as the line port for output (FIG. 7). To this 0th logical port (LA#0), the next hop RT20 of the first IP address range IPrange1 is connected. Furthermore, the process advances from Step S130 to Step S140.

In Step S140, the destination determining module 214 (FIG. 4) decides by lookup in the flow table 450 (FIG. 10) whether a control value has been established for bandwidth control (bandwidth limit (upper limit)) of the output VLAN. In the example of FIG. 14, the discussion assumes that no bandwidth limit has been set for the 100$^{th}$ VLAN.

In the event that a bandwidth limit has not been set for the output VLAN, in the next Step S162, the destination determining module 214 selects one physical port from the output logical port, based on a hash value. Here, the hash value is provided by the hash value generator 220 (FIG. 4).

The hash value generator 220 calculates the hash value using the header information 521 (FIG. 5 (B)). Specifically, the hash value generator 220 divides the data 504 to 509 of the header information 521 into 8-bit segments. The hash value generator 220 then adds up all of the 8-bit data. This addition is performed without carry. The hash value generator 220 then uses a value derived by inverting the sequence of bits of the 8-bit addition result as the hash value. The hash value derived in this way is 8-bit data, with a value range of 0 to 255.

Next, the destination determining module 214 (FIG. 4) uses the hash value to determine a selection number. This computation is carried out according to the following expression.

the selection number=the quotient {(hash value*total number of physical ports included in logical port)/256}

Next, the destination determining module 214 looks up in the link aggregation table 400 (FIG. 6) and employs the physical port corresponding to the selection number as the output physical port. In this way, with reference to the hash value, one output physical port is selected from among multiple physical ports included in the logical port. In the example of FIG. 14, the first physical port #1 is selected as the output physical port for the first packet P1.

Once the output physical port has been determined in this manner, in the next Step S180 (FIG. 11), the received packet and the output information are transmitted to the CSW 880.

Next, the packet output process (FIG. 12) is executed. This process is executed in the same manner as in the example of FIG. 13. In the example of FIG. 14, since it is assumed that no bandwidth limit has been set for the output VLAN (100$^{th}$ VLAN), the transmitter 830 of the first NIF 801 transmits the first packet P1 from the first physical port #1 to the next hop (the second switch device RT20).

The relay process is carried out for the second packet P2 as well, in same manner as for the first packet P1. In the example of FIG. 14, the first physical port #1 is selected in relation to the first packet P1, and the second physical port #2 is selected in relation to the second packet P2. The hash value computed in Step S162 of FIG. 11 can assume various values depending on the data (seed information) utilized to compute the hash value. Various physical ports may be selected as the output physical port, depending on the hash value. In Step S162 of FIG. 11, the seed information includes data representing the source (MAC address, IP address, L4 port) and data representing the destination (MAC address, IP address, L4 port). Accordingly, the output physical port can be distributed according to the combination of source and destination. As a result, communication load bias towards certain physical ports of the logical port can be suppressed.

B3. Packet Transmission from a Logical Port with Bandwidth Limitation

FIG. 15 is a simplified diagram illustrating operation in the event of packet transmission from a logical port with limited bandwidth. In this example, an instance of relaying the same two packets P1, P2 as in the example of FIG. 14 is shown.

First, the relay process for the first packet P1 will be described. Steps S100 to S140 of the packet input process (FIG. 11) are executed in the same manner as the example of FIG. 14. In the example of FIG. 15 however, a bandwidth limit is established for the 100$^{th}$ VLAN, in accordance with the flow table 450 shown in FIG. 10. As a result, the process advances from Step S140 to Step S150.

In the next Step S150, the destination determining module 214 (FIG. 4), through lookup in the link aggregation table 400 (FIG. 6), decides whether the output logical port spans multiple transmitters 830. In the event that all of the physical ports included in the output logical port belong to a single NIF, it will be decided that the output logical port does not span multiple transmitters 830. The process then advances to Step S162, and the packet input process is executed in the same manner as the example of FIG. 14.

If at least part of the multiple physical ports included in the output logical port belong to an NIF different from another NIF to which the other physical port belongs, that is, in the event that the output logical port includes multiple physical ports that exist distributed in two or more NIFs, it will be decided that the output logical port spans multiple transmitters 830. In the example of FIG. 15, the 0th logical port (LA #0) spans two NIFs 801, 802 (two transmitters 830). An upper limit has been established for the 100$^{th}$ VLAN which includes the 0th logical port (LA #0). Accordingly, in the example of FIG. 15, the 0th logical port (LA #0) corresponds to the "distributed-control logical port" of the claims.

In the event that the output logical port spans multiple NIFs, in the next Step S160, the destination determining module 214 (FIG. 4) will select one physical port from the output logical port, based on an output VLAN hash value. The output VLAN hash value is a hash value that uses only the VLAN-ID of the output VLAN as the seed information. This hash value is provided by the hash value generator 220 (FIG. 4). The hash value generator 220 acquires the output VLAN from the data search module 212, and computes the hash value using only the VLAN-ID of the output VLAN. The computational expression utilized for calculating the hash value is the same as the computational expression in Step S162. However, the seed information differs between Step S160 and Step S162. The method of selecting the output physical port from the hash value is also the same as the selection method in Step S162. In the example of FIG. 14, the first physical port #1 has been selected in relation to the first packet P1.

Once the output physical port has been determined in this manner, in the next Step S180 (FIG. 11), the received packet and the output information are transmitted to the CSW 880.

Next, the packet output process (FIG. 12) is executed. This process is executed in the same manner as in the example of FIG. 13. In the example of FIG. 15, a bandwidth limit has been set for the output VLAN (100$^{th}$ VLAN). Accordingly, the transmitter 830 of the first NIF 801 decides, depending on this upper limit, whether to transmit the first packet P1 or discard it (Step S220).

The relay process is carried out for the second packet P2 as well, in same manner as for the first packet P1. In Step S160 of FIG. 11, when the same output VLAN is selected, the same hash value will be calculated irrespective of the combination of source and destination. As a result, one specific physical port in the logical port will be selected irrespective of the combination of source and destination. As a result, in the example of FIG. 15, the same first physical port #1 as that for the first packet P1 will be selected as the output physical port for the second packet P2 as well.

The reason for selecting one specific physical port in the logical port irrespective of the combination of source and destination in the event that the output logical port spans multiple NIFs is as follows. The transmitter 830 can only control data transfer speed in relation to physical ports connected to itself. Even if a logical port spans multiple transmitters 830, each individual transmitter 830 controls data transfer speed only in relation to data transfer via physical ports connected to itself. As a result, there is a possibility that the total transfer speed of all of the physical ports included in the logical port will significantly exceed the upper limit.

For example, let it be assumed that the data transfer speed of the 100$^{th}$ VLAN is limited to 100 Mbps in the example illustrated in FIG. 14 in which the data transmission using the 0th logical port (LA#0) is distributed to the two physical ports #1, #2. In this case, the transmitter 830 of the first NIF 801 will limit the data transfer speed via the first physical port #1 to 100 Mbps. Similarly, the transmitter 830 of the second NIF 802 will limit the data transfer speed via the second physical port #2 to 100 Mbps. As a result, it is possible that the total data transfer speed through the two physical ports #1, #2 included in the 0th logical port (LA#0) will reach 200 Mbps, significantly exceeding the upper limit (100 Mbps).

However, as shown in FIG. 15, in the present embodiment, one specific physical port in the logical port will be selected irrespective of the combination of source and destination of a received packet. Consequently, a single transmitter 830 (in the example of FIG. 15, the transmitter 830 of the first NIF 801) controls data transfer speed in relation to the physical ports connected to itself, whereby the data transfer speed of the entire logical port is controlled. As a result, the total data transfer speed of all physical ports included in the logical port can be prevented from exceeding the upper limit.

The advantage of using a logical port that spans multiple NIFs is as follows. Specifically, even in the event that some of the NIFs should encounter a fault, communication can continue using the remaining NIFs. As a result, it is possible to increase reliability in relation to NIF faults. As mentioned previously, in the present embodiment bandwidth control can be carried out appropriately in relation to a logical port that spans multiple NIFs. Consequently, it is possible to prevent the data transfer speed of the logical port from exceeding the upper limit, and to increase reliability in relation to NIF faults.

Moreover, in the present embodiment, the transmitter 830 and the bandwidth search module 840 (FIG. 3) as whole correspond to the "bandwidth controller " in the claims. The header processor 820 corresponds to the "destination processor." The controller 890 corresponds to the "bandwidth control setting module." The output VLAN corresponds to the "output port group." The VLAN-ID of the output VLAN corresponds to the "output port group information." The hash value generator 220 (FIG. 4) corresponds to the "computing module." In the example of FIG. 3, each of the NIFs 801 to 804 has the "destination processor (the header processor 820) ." However, physical port communication could instead be controlled by a single "destination processor " independent of the NIFs. It would also be possible for the controller 890 to function as a VLAN establishing module for establishing the VLANs.

C: Variants

The constituent elements of the preceding embodiments, apart from element claimed in the independent claims, are additional elements and can be dispensed with where appropriate. The invention is in no wise limited to the embodiments described hereinabove and can be reduced to practice in various other ways without departing from the scope and spirit thereof, as in the following variants.

Variant 1

In the preceding embodiments, as the process executed by the bandwidth controller, it would be possible to employ any process capable of specifying an upper limit for bandwidth of the each line port included in an output port group. For example, it would be possible to employ a process of specifying, on an individual line port basis, an upper limit for the transfer speed of each port included in the output VLAN.

Step S230 of FIG. 12, that is, the process carried out in the event that transferring received packets would result in transfer speed exceeding the upper limit, is not limited to a process of discarding the received packets. It would be possible to employ any process capable of preventing transfer speed from exceeding the upper limit. For example, it would be possible to employ a process of saving the received packets in memory, and then transmitting those received packets when transfer speed has slowed.

Moreover, in the preceding embodiments, bandwidth control is not limited to specifying an upper limit for data transfer speed as shown in FIG. 12. It is possible to employ various other ways of controlling data transfer speed as well. It is also possible to employ various values utilized in bandwidth control as the control value for bandwidth control. For example, a lower limit for data transfer speed could be assured. Specifically, using a lower limit value for data transfer speed as the control value for bandwidth control, it is preferable to ensure that packet relay at data transfer speed above the lower limit value is executed, even in instances where the switch device RT10 relays a considerable amount of data per unit of time. Control utilizing a combination of an upper limit for data transfer speed and a lower limit for data transfer speed could be utilized for bandwidth control as well.

As the process for assuring a lower limit for data transfer speed, it would be possible to use the process described below for example. Here, consider the case of transmission of packets from a given line port (physical port). Let it be assumed that this physical port belongs to two VLANs (a first VLAN and a second VLAN) (such a case could be, for example, one where a so-called "Tag-VLAN" is utilized). Furthermore, let it be assumed that a lower limit value of 100 Mbps has been established for the first VLAN, while no lower limit value has been established for the second VLAN. Let it be assumed also that limit values are applied on an individual line port basis. Here, among packets whose output VLAN is the first VLAN (hereinafter termed "first VLAN packet"), the transmitter 830 (FIG. 3) will transmit the packets in an amount equivalent to the lower limit irrespective of the condition of bandwidth utilization by the physical port. With regard to first VLAN packets in excess of the lower limit, and packets whose output VLAN is the second VLAN, these packets will be transmitted utilizing free physical bandwidth of the physical port. In the absence of free bandwidth, these packets will be discarded. As a result, with regard to first VLAN packets, it is possible to assure that the packets are relayed at data transfer speed at least equal to the lower limit, irrespective of the condition of bandwidth utilization by the physical port. The process of ensuring a lower limit for data transfer speed discussed above can be carried out analogously in instances of bandwidth control of a distributed-control logical port.

To ensure a lower limit for data transfer speed, associations of output VLANs with lower limit values are stored in the flow table 450 (FIG. 10). In Step S140 of FIG. 11, the destination determining module 214 (FIG. 4) will lookup in the flow table 450 in order to decide whether a control value (lower limit value) for bandwidth control has been established for the output VLANs. Meanwhile, the bandwidth search module 840 (FIG. 3) will search for the lower limit value for each output VLAN, in the same manner as Step S210 of FIG. 12. The process carried out in the event that there is no free bandwidth is not limited to discarding excess packets. Any process making the packet relay possible to be executed at or above the lower limit for data transfer speed can be employed in relation to packet relay with a lower limit for bandwidth control. For example, it would be possible to employ a process of saving the excess received packets in memory, and then transmitting those received packets when transfer speed has slowed.

In any case, it would be possible to employ the process illustrated in FIG. 11 as the packet input process. In Step S140, it is decided whether a control value for bandwidth control has been set. The other steps are carried out in same manner as in the embodiments described previously. By so doing it is possible to appropriately control the bandwidth of a distributed-control logical port.

Variant 2

In the preceding embodiments, the seed information of the hash value (normal hash value) computed in Step S162 of FIG. 11 is not limited to the information utilized in the preceding embodiments, and it is possible to employ various types of information that includes at least one of the destination information and source information associated with received packets. For example, the computation may be performed using source information only, without using destination information. By so doing, multiple physical ports can be assigned for use according to the source. Conversely, the computation may be performed using destination information only, without using source information. By so doing, multiple physical ports can be assigned for use according to the destination.

The reason for using information that includes at least one of destination information and source information as the seed information is as follows. The purpose is to prevent rearrangement of the transfer sequence of multiple packets transferred between two network devices, due to relaying of the packets by network relay devices.

The packet communication method herein is not limited to methods employing Ethernet (TM) or methods using Internet Protocol, it being possible to employ any communication method. In any case, various types of information relating to destination (e.g. any information from among the destination MAC address, destination IP address, or destination port (L4 port)) can be used as destination information for use as the seed information. Likewise, various types of information relating to source (e.g. any information from among the source MAC address, source IP address, or source port (L4 port)) can be used as source information for use as the seed information. Similarly, various types of information can be utilized as the destination information used to select the output line port.

Variant 3

In the preceding embodiments, the computational expression used to select a physical port for output (transmission) purposes from among multiple physical ports included in a logical port is not limited to the computational expression described in Steps S160 and S162 of FIG. 11, it being possible to employ various computational expressions for the purpose of computing representative values from the seed information. In preferred practice, a hash function will be employed as the computational expression. A hash function is a function for generating pseudo-random numbers (hash values) of fixed length from the seed information. The hash function is not limited to the computational expression described in Steps S160 and S162 of FIG. 11, it being possible to employ various other functions such as MD5 (Message Digest 5), SHA-1 (Secure Hash Algorithm 1), SHA-2, or the like. Where a hash function is employed, value range bias in the computation results (hash values) is small. Furthermore, similar computation results (hash values) are not readily generated from the similar seed information. Accordingly, where a hash function is employed as the computational expression, it is a simple matter to avoid bias towards a specific physical port in selection of the physical port in Step S162 of FIG. 11. As a result, in instances where it is acceptable to ignore bandwidth control in a logical port that spans multiple NIFs (bandwidth controllers), the communication load can be distributed among the multiple physical ports included in the logical port Variant 4

In the preceding embodiments, the same computational expression (hash function) is employed to select an output physical port from a logical port, irrespective of whether a control value for bandwidth control has been established, that is, whether the port is targeted for bandwidth control. The seed information utilized in the computational expression changes according to whether a control value for bandwidth control has been established. As a result, both bandwidth control in a distributed-control logical port, and distribution of communication load in a logical port for which a control value for bandwidth control has not been established, can be accomplished by simply changing the seed information. Specifically, the computing module (FIG. 4: hash value generator 220) for selecting one output physical port from a logical port can be utilized for both selection of output physical port from a logical port for which the control value for bandwidth control has not been established, and selection of an output physical port from a distributed-control logical port. As a result, it is possible to avoid an excessively complex network relay device configuration in order to attain these two advantages.

Variant 5

In the preceding embodiments, the method for selecting an output physical port from a logical port for which a control value for bandwidth control has not been established is not limited to a method based on the results of a computation using at least one of destination information and source information as the seed information (FIG. 11: S162). It is possible to employ any method for doing so. For example, the same method as Step S160 could be employed.

It is possible to employ any arbitrary method as the method for selecting an output physical port in the event of a decision of "No" in Step S150 of FIG. 11, i.e. where a control value for bandwidth control has been established and the logical port includes exclusively of multiple physical ports existing in a single interface unit. For example, the same method as Step S160 could be employed in place of Step S162.

Variant 6

In the preceding embodiments, the output port groups are not limited to output VLANs, and it would be possible to employ any arbitrarily established groups. However, where a switch device that divides a network by VLANs is utilized, there will be numerous instances in which control of desirable data transfer speed differs by individual VLAN. Accordingly, where VLAN are employed as the output port groups, bandwidth can be controlled on an individual VLAN basis.

Moreover, it is acceptable for a single physical port to belong to multiple output port groups. For example, where so-called "Tag-VLAN" is employed, a single physical port belongs to multiple VLANs. In this case, any of various methods can be used as the method for identifying the receiving VLAN. For example, the receiving VLAN could be identified based on the VLAN-ID contained in the received packets.

In any case, when received packets from a physical port not included in an output VLAN are relayed to the output VLAN, it will be preferable to execute a process for selecting a distributed-control logical port based on destination information (corresponding to the "first process") and a process of selecting a single specific output physical port from the distributed-control logical port based on the VLAN-ID of the output VLAN (corresponding to the "second process"). The degree of freedom in design of a network employing network relay devices can be increased by relaying received packets to the output VLAN from outside the output VLAN in this way. Appropriate control of the bandwidth of the distributed-control logical port can then be accomplished by selecting a single specific output physical port based on the VLAN-ID of the output VLAN. Particularly where received packets are relayed between mutually different virtual LANs, it will preferable to execute a process equivalent to the first process and a process equivalent to the second process. By so doing, appropriate control of the bandwidth of the distributed-control logical port can be carried irrespective of the receiving VLAN. Where the receiving VLAN is different from the output VLAN, the physical port which received the packet (hereinafter called the "receiving physical port") can be a physical port that is not included in the output VLAN. This will be true also where that physical port belongs to both the receiving VLAN and the output VLAN. That is, receipt of packets by a physical port not included in the "output VLAN" refers to the fact that the receiving physical port receives the packets, not as a member of the same VLAN as the "output VLAN."

Variant 7

The method for selecting an output physical port from a distributed-control logical port is not limited to a method based on the result of a calculation. Various other methods can be employed instead. In general, it would be acceptable to employ any method whereby one specific physical port is selected from among multiple physical ports included in a distributed-control logical port, based on output port group information unique to the output port group that includes the distributed-control logical port.

For example, in Step S160 of FIG. 11, where one specific physical port is selected based on output port group information (the VLAN-ID of the output VLAN), other information could be used as the seed information in addition to the VLAN-ID of the output VLAN.

It is also acceptable to establish associations between output port group information and selection numbers (FIG. 6) in advance, and to select the output physical port based on these associations. These associations may be established according to instructions by the user, or automatically (e.g. randomly) by the controller 890 (FIG. 3). In this case, the controller 890 will function as an output port association establishing module, in addition to its function as the bandwidth control setting module.

Variant 8

In the preceding embodiments, the configuration of the network relay devices (switch devices) is not limited to the configuration depicted in FIGS. 2 to 4, and various other configurations may be employed instead. For example, the total number of NIFs provided to a single switch device is not limited to "4," and it is possible to employ any other number instead. Moreover, the total number of physical ports provided to a single NIF can be any arbitrary number. In the example of FIG. 3, each NIF has a memory 850, but it would be possible instead for all of the NIFs to share a single memory. It would also be acceptable for a single header processor provided independently of the NIFs to execute the packet input process in relation to all of the physical ports. It would also be acceptable for the receiver 810 provided independently of the NIFs. In any case, it is preferable to employ a total number of "2" or more of interface units each including a bandwidth controller (the transmitter 830 and the bandwidth search module 840) and one or more physical ports. By so doing, the bandwidth control process will be distributed among multiple bandwidth controllers, thereby reducing the time required for the process.

Variant 9

In the preceding embodiments, some of the arrangements realized through hardware could be replaced by software, and conversely some of the arrangements realized through software could be replaced by hardware. For example, the header processor 820 of FIG. 3 could be replaced by a computer having a CPU and memory. In this case, the various functions of the header processor 820 would be achieved through execution of a program by the CPU.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A network relay device for relaying packets, comprising:
a plurality of interface units, each of the interface units including one or more physical ports for connection to a line, and a bandwidth controller configured to control transmission bandwidth for packets received by the physical ports, wherein the physical ports of the plurality of interface units are classified into a plurality of output port groups each including one or more physical ports, each output port group being associated with output port group information, wherein an output port group forms a virtual LAN architecture that divides a network including the plurality of physical ports into virtual partial networks;
a destination processor configured to, based on destination information associated with a received packet, select from among the physical ports, a single output physical port for transmission of the received packet; and
a bandwidth control setting module configured to set a control value of bandwidth control used by the bandwidth controller, the control value being set individually for at least one of the plurality of output port groups;
wherein the network relay device is configured to form one or more distributed-control logical ports each including plural physical ports which are distributed across two or more of the interface units, plural physical ports of a single distributed-control logical port being aggregated as a single virtual logical port by a link aggregation function of the network relay device, plural physical ports of a single distributed-control logical port being included in a single output port group for which the control value has been set, and
wherein the destination processor executes:
(i) a first process of selecting the distributed-control logical port for transmission of the received packet based on the destination information,
(ii) a second process of selecting a same single specific physical port as the output physical port from among the physical ports included in the distributed-control logical port based on the output port group information unique to the output port group including the distributed-control logical port.

2. The network relay device according to claim 1, wherein the virtual LAN architecture includes a plurality of virtual LANs each representing one of the plurality of output port groups, the plurality of virtual LANs including one or more bandwidth-controlled virtual LANs for which the control value has been set, and
the destination processor executes the first process and the second process when relaying the received packet to one of the bandwidth-controlled virtual LANs from a physical port that is not included in the same virtual LAN.

3. The network relay device according to claim 1, wherein the destination processor comprises:
a computing module configured to execute a computational process in accordance with a prescribed computational expression; and a destination determining module configured to, based on the computation result, select the output physical port from among the physical ports included in a logical port; and the computing module includes:

a first mode for executing the computational process using the output group information, for the purpose of selecting the output physical port from the distributed-control logical port; and a second mode for executing the computational process using at least one of the destination information and source information associated with the received packet, for the purpose of selecting the output physical port from a logical port for which the control value has not been set.

4. The network relay device according to claim 3, wherein the computational expression used in the computational process is a hash function.

5. A method of relaying packets using a network relay device including a plurality of interface units, each of the interface units including one or more physical ports for connection to a line, and a bandwidth controller configured to control transmission bandwidth for packets received by the physical ports, wherein the physical ports of the plurality of interface units are classified into a plurality of output port groups each including one or more physical ports, each output port group being associated with output port group information, wherein an output port group forms a virtual LAN architecture that divides a network including the plurality of physical ports into virtual partial networks, and the method comprises the steps of:

(A) at the network relay device, setting a control value of bandwidth control used by the bandwidth controller, the control value being set individually for at least one of the plurality of output port groups; and (B) at the network relay device, selecting from among the physical ports a single output physical port for transmission of a received packet, based on destination information associated with the received packet;

wherein the network relay device is configured to form one or more distributed-control logical ports each including plural physical ports which are distributed across two or more of the interface units, plural physical ports of a single distributed-control logical port being aggregated as a single virtual logical port by a link aggregation function of the network relay device, plural physical ports of a single distributed-control logical port being included in a single output port group for which the control value has been set, and wherein the step of selecting the output physical port includes the steps of:

(i) at the network relay device, executing a first process of selecting the distributed-control logical port for transmission of the received packet based on the destination information; and (ii) at the network relay device, executing a second process of selecting a same single specific physical port as the output physical port from among the physical ports included in the distributed-control logical port based on the output port group information unique to the output port group including the distributed-control logical port.

6. The method according to claim 5, wherein the virtual LAN architecture includes a plurality of virtual LANs each representing one of the plurality of output port groups, the plurality of virtual LANs including one or more bandwidth-controlled virtual LANs for which the control value has been set, and the first process and the second process are executed when relaying the received packet to one of the bandwidth-controlled virtual LANs from a physical port that is not included in the same virtual LAN.

7. The method according to claim 5, wherein the step of selecting the output physical port includes the steps of:

at the network relay device, executing a computational process in accordance with a prescribed computational expression; and at the network relay device, selecting the output physical port from among the physical ports included in a logical port, based on the computation result;

wherein the step of executing the computational process includes the steps of:

in the event of selection of the output physical port from the distributed-control logical port, at the network relay device, selecting and executing the computational process using the output group information and in the event of selection of the output physical port from a logical port for which the control value has not been set, at the network relay device, selecting and executing the computational process using at least one of the destination information and source information associated with the received packet.

8. The method according to claim 7, wherein the computational expression used in the computational process is a hash function.

9. A network relay device for relaying packets, comprising:

a plurality of interface units, each interface unit including one or more physical ports for connection to a line, and a bandwidth controller configured to control transmission bandwidth for packets received by the physical ports of the interface unit, wherein the physical ports of the plurality of interface units are classified into a plurality of output port groups, each output port group including one or more physical ports and being associated with output port group information, wherein an output port group forms a virtual LAN architecture that divides a network including the plurality of physical ports into virtual partial networks;

a destination processor configured to, based on destination information associated with a received packet, select from among the physical ports, a single output physical port for transmission of the received packet; and a bandwidth control setting module configured to set a control value of bandwidth control used by the bandwidth controller, the control value being set individually for at least one of the plurality of output port groups;

wherein the network relay device is configured to form one or more distributed-control logical ports, each distributed-control logical port including plural physical ports which are distributed across two or more of the interface units, plural physical ports of a single distributed-control logical port being aggregated as a single virtual logical port by a link aggregation function of the network relay device, select plural physical ports of a single distributed-control logical port being included in a single output port group for which the control value has been set, and wherein the destination processor executes:

(i) a first process of selecting the distributed-control logical port for transmission of the received packet based on the destination information, (ii) a second process of consistently using a consistent single specific physical port as the output physical port from among the physical ports included in the distributed-control logical port based on the output port group information unique to the output port group including the distributed-control logical port.

* * * * *